United States Patent [19]

Golden et al.

[11] Patent Number: 5,447,557
[45] Date of Patent: Sep. 5, 1995

[54] OXYGEN SELECTIVE ADSORBENTS

[75] Inventors: Timothy C. Golden, Allentown; Wilbur C. Kratz, Macungie, both of Pa.; Mindy N. Mead, Clinton, N.J.

[73] Assignee: Air Products and Chemicals, Inc., Allentown, Pa.

[21] Appl. No.: 216,739

[22] Filed: Mar. 23, 1994

[51] Int. Cl.$^6$ .............................................. B01D 53/04
[52] U.S. Cl. ............................................ 95/96; 95/98; 95/138; 95/903; 96/108; 423/219
[58] Field of Search ............... 95/96, 106, 115, 138, 95/901, 903; 96/108, 153; 55/512, 524; 423/219

[56] References Cited

U.S. PATENT DOCUMENTS

| | | | |
|---|---|---|---|
| 3,876,393 | 4/1975 | Kasai et al. | 95/134 |
| 3,960,522 | 6/1976 | Munzner et al. | 95/138 |
| 3,979,330 | 9/1976 | Munzner et al. | 252/445 |
| 4,415,340 | 11/1983 | Knoblauch et al. | 95/138 X |
| 4,528,281 | 7/1985 | Sutt, Jr. | 502/402 |
| 4,540,678 | 9/1985 | Sutt, Jr. | 502/5 |
| 4,627,857 | 12/1986 | Sutt, Jr. | 55/70 |
| 4,629,476 | 12/1986 | Sutt, Jr. | 55/68 |
| 4,702,749 | 10/1987 | Sircar et al. | 95/901 X |
| 4,742,040 | 5/1988 | Ohsaki et al. | 502/426 |
| 4,746,502 | 5/1988 | Erickson | 423/219 X |
| 4,880,765 | 11/1989 | Knoblauch et al. | 502/432 |
| 5,071,450 | 12/1991 | Cabrera et al. | 95/138 |
| 5,081,097 | 1/1992 | Sharma et al. | 502/417 |
| 5,086,033 | 2/1992 | Armor et al. | 95/138 X |

*Primary Examiner*—Robert Spitzer
*Attorney, Agent, or Firm*—Mary E. Bongiorno

[57] ABSTRACT

An oxygen selective adsorbent and a method for making an oxygen selective adsorbent wherein a porous carbon substrate such as a carbon molecular sieve, activated carbon, carbon black, coal, or petroleum coke, is impregnated with a solution of an acidic species and the impregnated substrate is dried. The oxygen selective adsorbent can be used in a pressure swing adsorption process for the separation of oxygen from nitrogen, for example, in air.

12 Claims, 2 Drawing Sheets

5,447,557

OXYGEN SELECTIVE ADSORBENTS

FIELD OF THE INVENTION

The present invention is directed to improved adsorbents for selectively removing oxygen from nitrogen and a technique for making the adsorbents.

BACKGROUND OF THE INVENTION

A principal method for producing nitrogen from air is pressure swing adsorption (PSA). Carbon molecular sieves and zeolites are the most common adsorbents in PSA systems for production of nitrogen, but the main drawbacks of currently available adsorbents are their high cost of production and final product variability. A major challenge in this area of technology is to improve the structure of carbon molecular sieves in order to attain higher air recoveries, higher nitrogen productivity, and better consistency in adsorbent properties—all at a lower cost. In order to accomplish these goals, improvement in adsorbent properties, such as selectivity and equilibrium adsorption capacity, are needed.

Carbon molecular sieves are effective for separating oxygen from nitrogen because the rate of adsorption of oxygen is higher than that of nitrogen. The difference in rates of adsorption is due to the difference in size of the oxygen and nitrogen molecules. Since the difference in size is quite small, approximately 0.2 Å, the pore structure of the carbon molecular sieve must be tightly controlled in order to effectively separate the two molecules. In order to improve the performance of carbon molecular sieves, various techniques have been used to modify pore size. The most common method is the deposit of carbon on carbon molecular sieves. For example, U.S. Pat. No. 3,979,330 discloses the preparation of carbon containing molecular sieves in which coke containing up to 5% volatile components is treated at 600° C.-900° C. in order to split off carbon from a hydrocarbon. The split-off carbon is deposited in the carbon framework of the coke to narrow the existing pores.

Sutt, in U.S. Pat. Nos. 4,528,281, 4,540,678, 4,627,857, and 4,629,476, discloses various preparations of carbon molecular sieves for use in separation of gases. U.S. Pat. No. 4,528,281 discloses impregnating a molecular sieve with a polymer having a molecular weight of at least 400. U.S. Pat. Nos. 4,540,678 and 4,627,857 disclose preparation of carbon molecular sieves by heating a charred naturally occurring substrate or an agglomerated naturally occurring substrate to temperatures of about 500° C. to about 1100° C.

U.S. Pat. No. 4,742,040 discloses a process for making a carbon molecular sieve having increased adsorption capacity and selectivity by pelletizing powder coconut shell charcoal containing small amounts of coal tar as a binder, carbonizing, washing in mineral acid solution to remove soluble ingredients, adding specified amounts of creosote or other aromatic compounds, heating at 950° C.-1000° C., and then cooling in an inert gas.

U.S. Pat. No. 4,880,765 discloses a process for producing carbon molecular sieves with uniform quality and good separating properties by treating a carbonaceous product with inert gas and steam in a vibrating oven and further treating it with benzene at high temperatures to thereby narrow existing pores.

U.S. Pat. No. 5,081,097 discloses copper modified carbon molecular sieves for selective removal of oxygen. The sieve is prepared by pyrolysis of a mixture of a copper-containing material and a polyfunctional alcohol to form a sorbent precursor. The sorbent precursor is then heated and reduced to produce a copper modified carbon molecular sieve.

SUMMARY OF THE INVENTION

This invention relates to oxygen selective adsorbents with enhanced kinetic oxygen selectivity and a technique for making them by adjusting the pore size of a porous carbon precursor. A porous carbon precursor is impregnated with an acidic species as a means of reducing the pore size and making it more efficient for removing oxygen from nitrogen. The porous precursor is impregnated with an acid solution and then dried to remove excess solvent. This invention also relates to the use of the resultant oxygen selective adsorbent to separate oxygen and nitrogen in, for example, a pressure swing adsorption process.

The major advantages to this invention are:
 it produces a novel adsorbent for selective removal of oxygen from gas streams;
 it provides a more economical method for producing an oxygen-selective adsorbent;
 it provides an easy, controllable, and low temperature technique for producing an oxygen-selective adsorbent;
 it produces an adsorbent with improved consistency in adsorbent properties; and
 it produces an adsorbent which, when used in PSA systems, results in higher air recovery.

DETAILED DESCRIPTION OF THE INVENTION

Figure 1:
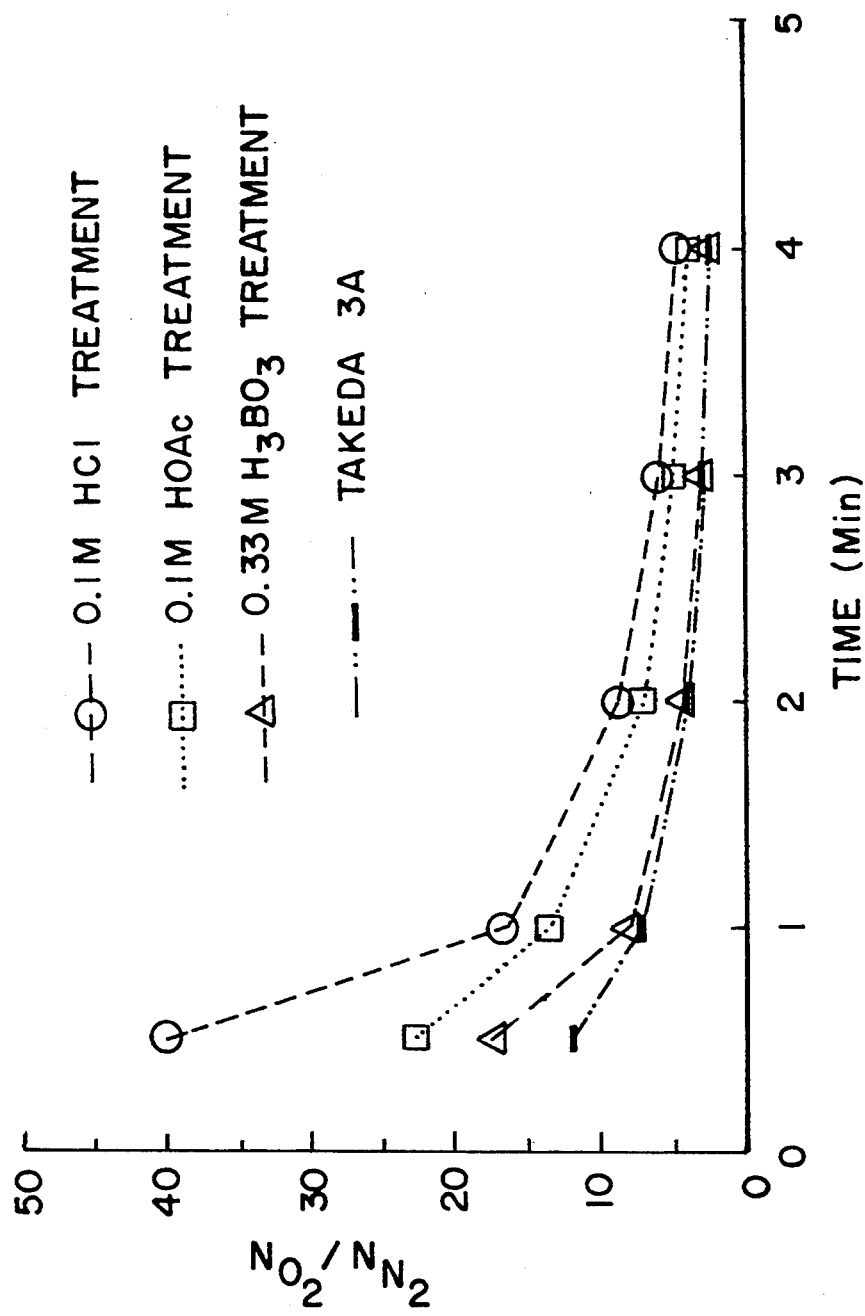
FIG. 1 shows the kinetic selectivity of oxygen over nitrogen for untreated and acid-treated Takeda 3A carbon molecular sieve (CMS).

The oxygen-selective adsorbent of this invention is produced by impregnating a porous carbon support with an aqueous or non-aqueous solution of an acidic species. Examples of porous carbon supports include carbon molecular sieves, activated carbon, carbon black, coal, and petroleum coke. Carbon molecular sieves are preferred since they are one of the most common adsorbents used in PSA systems for nitrogen production.

The starting material has an average pore diameter of approximately 10 Å or less; preferably approximately 5 Å or less.

Appropriate acidic species are Lewis or Lowry-Bronsted acids; for example, ferric chloride, boron trifluoride, aluminum chloride, stannic chloride, hydrochloric acid, sulfuric acid, acetic acid, and boric acid. Preferred acids are transition metal halides.

The amount of acidic species used for impregnation of the porous carbon support depends on the adsorption rate and the selectivity desired. For a carbon molecular sieve, it can range from about 0.01 wt % to about 10 wt % typically approximately 0.25 wt % of acidic species is added to the support.

Impregnation is accomplished using methods well known in the art; for example, incipient wetness technique, spray impregnation, and thermal spontaneous dispersion.

After the carbon support is impregnated with the acidic species, it is dried in air at a temperature of about 100° C. to about 150° C. for about 2 to about 8 hours, preferably 120° C. for 4 hours. Before drying, the mixture can be allowed to stand for approximately 1 to 2 hours in order to provide additional time for penetration of the acidic species into the porous surface of the support.

A useful application for the oxygen selective adsorbent thus produced is the separation of oxygen and nitrogen in a PSA process; preferably a dual-bed PSA process in which, in each bed, a series of steps are conducted comprising: adsorption at elevated pressure, pressure equalization between beds, desorption of the bed finishing adsorption, repressurization of the bed finishing desorption. After the desorption step, low pressure purging may be performed using part of the nitrogen enriched product stream as a back-purge or alternately using a separate purge stream.

The following examples are intended to illustrate embodiments of the invention and are not intended to restrict the scope thereof.

EXAMPLE 1

Two grams of $FeCl_3$ was dissolved in 16 ml of water. Using the incipient wetness technique, 40 grams of 4A carbon molecular sieve (CMS) from Takeda Chemical Co was impregnated with the $FeCl_3$ solution. The impregnated sieve was then dried at 120° C. for 4 hours. The oxygen and nitrogen adsorption isotherms and uptake rates were measured for the dried impregnated sieve and for the 4A CMS. Prior to making adsorption measurements, the samples were evacuated to less than 1 torr for 16 hours. Measurements were made in a standard volumetric apparatus, at 30° C., a dosing pressure of 150 torr, and a 25-gram sample. The results, presented in Table 1, show that the Takeda 4A CMS does not demonstrate kinetic selectivity for oxygen over nitrogen as noted by the ratio of $N_{O2}/N_{N2}$. However, the $FeCl_3$-impregnated CMS demonstrated kinetic selectivity for oxygen over nitrogen. These results indicate that introduction of an acidic inorganic species can alter the properties of CMS to create kinetic adsorption selectivity for oxygen over nitrogen. This method is less expensive, more controllable, and can be carried out at ambient temperature, as compared to current carbon deposition methods.

TABLE 1

| Adsorbent | (min) Time | (mmole/g) $N_{O2}$ | (mmole/g) $N_{N2}$ | $N_{O2}/N_{N2}$ |
| --- | --- | --- | --- | --- |
| 4A CMS (untreated) | 0.5 | $5.67 \times 10^{-2}$ | $5.84 \times 10^{-2}$ | 0.97 |
|  | 1.0 | $5.74 \times 10^{-2}$ | $6.00 \times 10^{-2}$ | 0.96 |
|  | 2.0 | $5.80 \times 10^{-2}$ | $6.13 \times 10^{-2}$ | 0.95 |
|  | 3.0 | $5.84 \times 10^{-2}$ | $6.17 \times 10^{-2}$ | 0.95 |
| $FeCl_3$/4A CMS | 0.5 | $5.10 \times 10^{-2}$ | $2.17 \times 10^{-2}$ | 2.4 |
|  | 1.0 | $5.41 \times 10^{-2}$ | $3.41 \times 10^{-2}$ | 1.6 |
|  | 2.0 | $5.66 \times 10^{-2}$ | $4.34 \times 10^{-2}$ | 1.3 |
|  | 3.0 | $5.77 \times 10^{-2}$ | $4.90 \times 10^{-2}$ | 1.2 |

EXAMPLE 2

Using the incipient wetness technique, 80 grams of 3A CMS (carbon molecular sieve) from Takeda Chemical Co. was impregnated with 32 ml of 0.15M boric acid. The impregnated sieve was air dried at 120° C. for 4 hours to remove excess solvent. Oxygen and nitrogen isotherms and uptake rates were measured on the 3A CMS and the $H_3BO_3$-impregnated CMS. Measurements were made in a standard volumetric apparatus using a 25-gram sample, at 30° C. and a dosing pressure of 150 torr. Prior to making the measurements, the 3A CMS and one sample of the boric acid-treated CMS were evacuated to less than 1 torr for 16 hours, and the second boric acid-treated CMS sample was heated in nitrogen at 300° C. for 16 hours. Oxygen and nitrogen uptake rates are presented in Table 2. The $H_3BO_3$/vacuum treated sample shows the highest $O_2/N_2$ selectivity. If the $H_3BO_3$ treated sample is also thermally treated, the $O_2/N_2$ selectivity is less than the $H_3BO_3$/vacuum treated CMS, but it is still greater than the untreated 3A CMS. Thermal treatment increased the rate of $O_2$ uptake ($N_{O2}$). In summary, deposit of an inorganic acid on oxygen selective carbon adsorbents increases the selectivity of the adsorbents and thermal treatment of the inorganic acid impregnated adsorbents increases the uptake rates for oxygen and nitrogen.

TABLE 2

| Adsorbaent | (min) Time | (mmole/g) $N_{O2}$ | (mmole/g) $N_{N2}$ | $N_{O2}/N_{N2}$ |
| --- | --- | --- | --- | --- |
| Takeda 3A CMS (untreated/ vacuum) | 0.5 | $4.71 \times 10^{-2}$ | $3.61 \times 10^{-3}$ | 13.0 |
|  | 1.0 | $5.25 \times 10^{-2}$ | $6.80 \times 10^{-3}$ | 7.7 |
|  | 2.0 | $5.48 \times 10^{-2}$ | $1.25 \times 10^{-2}$ | 4.4 |
|  | 3.0 | $5.55 \times 10^{-2}$ | $1.78 \times 10^{-2}$ | 3.1 |
| $H_3BO_3$ 3A CMS (vacuum) | 0.5 | $2.35 \times 10^{-2}$ | $5.82 \times 10^{-4}$ | 40.4 |
|  | 1.0 | $3.53 \times 10^{-2}$ | $1.51 \times 10^{-3}$ | 23.4 |
|  | 2.0 | $4.56 \times 10^{-2}$ | $3.13 \times 10^{-3}$ | 14.6 |
|  | 3.0 | $4.98 \times 10^{-2}$ | $4.51 \times 10^{-3}$ | 11.0 |
| $H_3BO_3$ 3A CMS (300° C.) | 0.5 | $4.25 \times 10^{-2}$ | $2.50 \times 10^{-3}$ | 17.0 |
|  | 1.0 | $5.23 \times 10^{-2}$ | $5.26 \times 10^{-3}$ | 9.9 |
|  | 2.0 | $5.75 \times 10^{-2}$ | $9.92 \times 10^{-3}$ | 5.8 |
|  | 3.0 | $5.91 \times 10^{-2}$ | $1.41 \times 10^{-2}$ | 4.2 |

EXAMPLE 3

Bergbau Forshung 3A CMS (carbon molecular sieve) was used to prepare three samples of $FeCl_3$-impregnated CMS. Using the incipient wetness technique, 40 grams of the CMS was impregnated with: (1) 0.1 gram of $FeCl_3$ dissolved in 16 ml of water; (2) 0.05 grams of $FeCl_3$ dissolved 16 ml of water; and (3) 0.1 grams of $AlCl_3$ dissolved in 16 ml of methanol. After impregnation, the samples were allowed to stand for two hours and then air dried at 120° C. for four hours to remove excess solvent. The $N_2$ and $O_2$ adsorption uptake rates for untreated Bergbau 3A CMS and the inorganic impregnated species were measured as described in Examples 1 and 2. Results of uptake rates, shown in Table 3, indicate that (1) impregnation of carbon molecular sieves with inorganic acid species increases the kinetic $O_2/N_2$ selectivity of the support; (2) adsorption rates and resultant selectivity can be controlled by increasing or decreasing the amount of inorganic species impregnated on the CMS; and (3) solvents other than water can be employed.

TABLE 3

| Adsorbent | (min) Time | (mmole/g) $N_{O2}$ | (mmole/g) $N_{N2}$ | $N_{O2}/N_{N2}$ |
| --- | --- | --- | --- | --- |
| Bergbau 3A CMS (untreated) | 0.5 | $4.47 \times 10^{-2}$ | $5.06 \times 10^{-3}$ | 8.8 |
|  | 1.0 | $4.90 \times 10^{-2}$ | $9.69 \times 10^{-3}$ | 5.1 |
|  | 2.0 | $5.05 \times 10^{-2}$ | $1.78 \times 10^{-2}$ | 2.8 |
|  | 3.0 | $5.11 \times 10^{-2}$ | $2.45 \times 10^{-2}$ | 2.1 |
| 0.25 wt % $FeCl_3$/Bergbau (water) | 0.5 | $3.25 \times 10^{-2}$ | $1.83 \times 10^{-3}$ | 17.8 |
|  | 1.0 | $4.11 \times 10^{-2}$ | $4.39 \times 10^{-3}$ | 9.4 |
|  | 2.0 | $4.56 \times 10^{-2}$ | $8.85 \times 10^{-3}$ | 5.2 |
|  | 3.0 | $4.68 \times 10^{-2}$ | $1.24 \times 10^{-2}$ | 3.8 |

TABLE 3-continued

| Adsorbent | (min) Time | (mmole/g) $N_{O2}$ | (mmole/g) $N_{N2}$ | $N_{O2}/N_{N2}$ |
|---|---|---|---|---|
| 0.12 wt % | 0.5 | $3.70 \times 10^{-2}$ | $3.44 \times 10^{-3}$ | 10.8 |
| FeCl$_3$/Bergbau | 1.0 | $4.47 \times 10^{-2}$ | $6.71 \times 10^{-3}$ | 6.7 |
| (water) | 2.0 | $4.67 \times 10^{-2}$ | $1.34 \times 10^{-2}$ | 3.5 |
|  | 3.0 | $4.73 \times 10^{-2}$ | $1.70 \times 10^{-2}$ | 2.8 |
| 0.25 wt % | 0.5 | $3.01 \times 10^{-2}$ | $9.63 \times 10^{-4}$ | 31.3 |
| AlCl$_3$/Bergbau | 1.0 | $4.00 \times 10^{-2}$ | $2.93 \times 10^{-3}$ | 13.6 |
| (methanol) | 2.0 | $4.61 \times 10^{-2}$ | $6.02 \times 10^{-3}$ | 7.7 |
|  | 3.0 | $4.73 \times 10^{-2}$ | $9.10 \times 10^{-3}$ | 5.2 |

EXAMPLE 4

Three samples of Takeda 3A CMS (carbon molecular sieve) were treated with hydrochloric acid, acetic acid, or boric acid. Using the incipient wetness technique, 40 grams of Takeda 3A CMS was impregnated with 16 ml of 0.1M HCl, 0.1M acetic acid, or 0.33M boric acid. The samples were allowed to stand for two hours and then dried in air at 120° C. for 4 hours. FIG. 1 clearly shows that acid treatment increases the selectivity ($N_{O2}/N_{N2}$) of Takeda 3A CMS.

EXAMPLE 5

Adsorbent prepared in this example was tested in a pilot plant. Aluminum chloride (22.8 g) was dissolved in 1816 ml of methanol. Takeda 3A carbon molecular sieve (CMS) (4540 g) was then impregnated with the aluminum chloride solution. The mixture was allowed to stand for 2 hours and then was air dried at 120° C. for 4 hours. The pilot plant consisted of two adsorbent beds; each bed was six feet long and two inches in diameter. The first one foot of the feed end of each bed contained alumina to remove water and the remaining five feet of bed contained modified Takeda 3A CMS, described above, or unmodified Takeda 3A CMS. Cycle steps and their duration for production of nitrogen from air are shown in Table 4 and are described below:

(1) the first adsorption bed was pressurized to 100 psig with ambient (approx 20° C.) air.
(2) the adsorption step is conducted resulting in a nitrogen enriched stream at the product end of the bed;
(3) the pressure in the first bed was equalized with the second bed which was at atmospheric pressure; and
(4) after pressure equalization, the first bed was vented to atmospheric pressure and readied for the next air feed cycle.

TABLE 4

| Nitrogen PSA Process Steps and Durations | |
|---|---|
| Cycle step | Duration (seconds) |
| Feed repressurization | 3.5 |
| Adsorption | 86.5 |
| Idle | 1.7 |
| Dual-end pressure equalization | 4 |
| Idle | 1.7 |
| Blowdown | 90 |
| Idle | 1.7 |
| Dual-end pressure equaliztion | 4 |
| Idle | 1.7 |

The beds operate in cyclic fashion so that when bed 1 undergoes repressurization and adsorption, bed 2 undergoes blowdown (see schematic below).

| Bed | | | | | |
|---|---|---|---|---|---|
| 1 | R | Adsorption | PE | | Blowdown |
| 2 | | Blowdown | PE | R | Adsorption |

R = Repressurization
PE = Pressure Equalization

Figure 2:
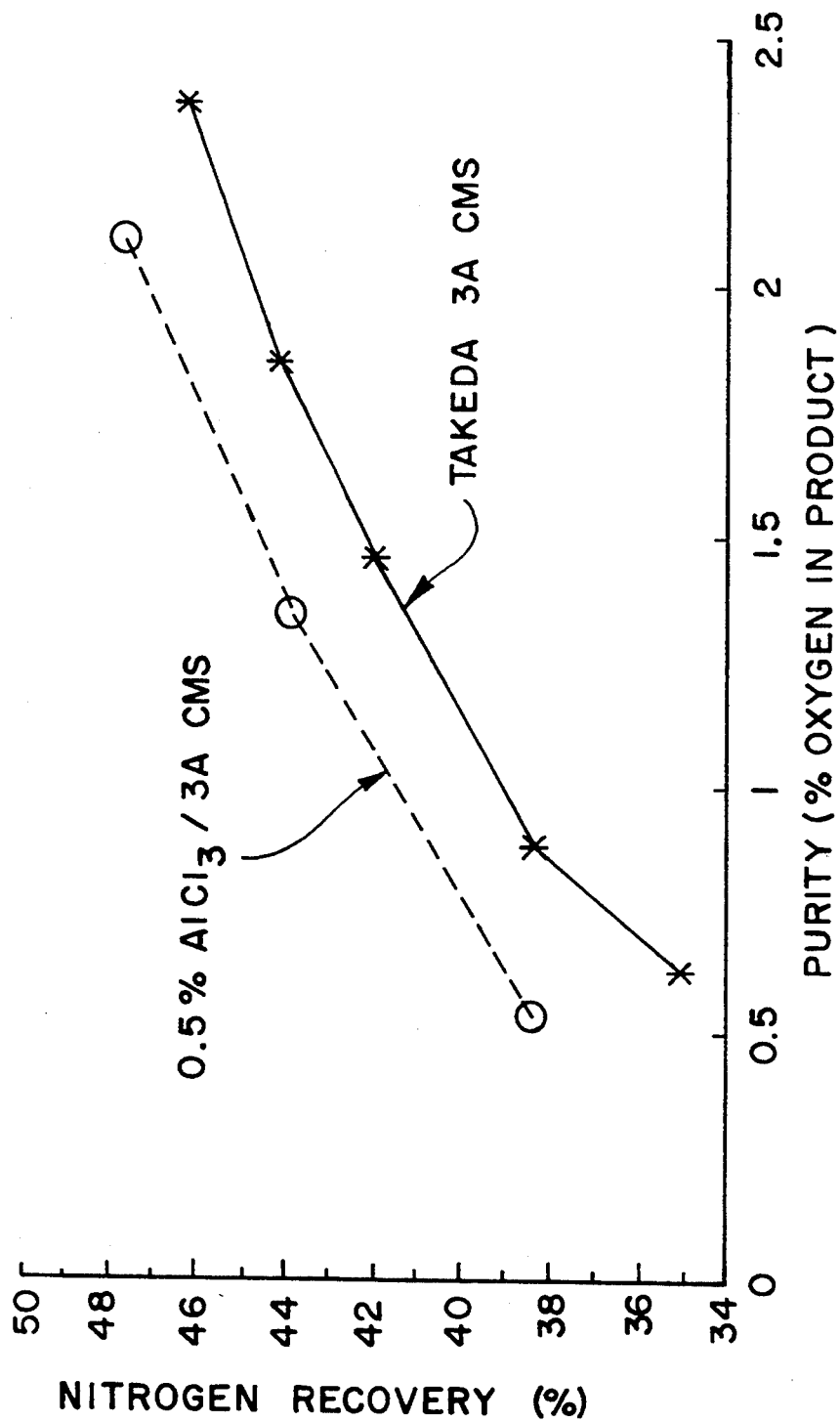
FIG. 2 shows nitrogen recovery vs. nitrogen purity for untreated Takeda 3A CMS and $AlCl_3$-treated Takeda 3A CMS.

Results of the pilot plant test are shown in FIG. 2. Impregnation with aluminum chloride increased the kinetic selectivity of the carbon molecular sieve and enhanced the nitrogen recovery of the system. This increase in nitrogen recovery reduces the operating costs of the plant.

STATEMENT OF INDUSTRIAL USE

Oxygen selective adsorbents produced by this invention may be used in pressure swing adsorption systems for separation of oxygen from nitrogen, for example in air separation.

We claim:

1. A method for separating oxygen from air comprising the steps of:
   (1) pressurizing an adsorbent bed containing an oxygen selective adsorbent comprising a porous carbon substrate impregnated with an acidic species;
   (2) passing a pressurized air stream over said adsorbent bed;
   (3) adsorbing oxygen from said pressurized air stream to produce a nitrogen enriched stream;
   (4) withdrawing said nitrogen enriched stream from said adsorbent bed;
   (5) stopping the flow of said pressurized air stream;
   (6) depressurizing said adsorbent bed; and
   (7) repeating steps 1 through 6 in a cyclic fashion.

2. The method of claim 1 wherein said porous carbon substrate is a carbon molecular sieve.

3. The method of claim 2 wherein said acidic species is a transition metal halide.

4. The method of claim 3 wherein said steps are carried out in two adsorbent beds so that while one bed is at step (2), the second bed is at step (5).

5. An oxygen selective adsorbent comprising a carbon molecular sieve impregnated with an acidic species.

6. The oxygen selective adsorbent of claim 5 wherein said acidic species is selected from the group consisting of ferric chloride, aluminum chloride, boric acid, hydrochloric acid, and acetic acid.

7. The oxygen selective adsorbent of claim 5 wherein said acidic species is a transition metal halide.

8. The oxygen selective adsorbent of claim 7 wherein said carbon molecular sieve is impregnated with approximately 0.01 wt % to about 10 wt % of said transition metal halide.

9. A method for making an oxygen selective adsorbent comprising:
   (a) impregnating a carbon molecular sieve with a solution of an acidic species; and
   (b) drying the impregnated carbon molecular sieve to form said oxygen selective adsorbent.

10. The method of claim 9 wherein said acidic species is selected from the group consisting of ferric chloride, aluminum chloride, boric acid, acetic acid and hydrochloric acid.

11. The method of claim 9 wherein said acidic species is a transition metal halide.

12. The method of claim 11 wherein said porous carbon substrate is impregnated with approximately 0.01 wt % to about 10 wt % of said transition metal halide.

* * * * *